United States Patent [19]

Krambrock

[11] 4,082,364

[45] Apr. 4, 1978

[54] METHOD AND APPARATUS FOR CHARGING BULK MATERIAL TO A PLURALITY OF RECEIVING STATIONS

[75] Inventor: Wolfgang Krambrock, Ravensburg, Germany

[73] Assignee: Waeschle Maschinenfabrik GmbH, Ravensburg, Germany

[21] Appl. No.: 608,218

[22] Filed: Aug. 27, 1975

[30] Foreign Application Priority Data

Aug. 27, 1974 Germany ............................. 2440888

[51] Int. Cl.² ........................................... B65G 53/04
[52] U.S. Cl. ........................................ 302/28; 302/42
[58] Field of Search ................. 302/3, 21, 22, 23, 25, 302/28, 35, 42, 51, 53, 57, 59, 66, 17

[56] References Cited

U.S. PATENT DOCUMENTS

| 2,895,768 | 7/1959 | Bray ............................ 302/28 X |
| 3,069,205 | 12/1962 | McIver et al. .................... 302/53 X |
| 3,414,330 | 12/1968 | Trützschler ......................... 302/28 |
| 3,694,037 | 9/1972 | Feder ............................. 302/35 X |
| 3,836,288 | 9/1974 | Evans ............................ 302/23 X |

FOREIGN PATENT DOCUMENTS

| 1,506,965 | 8/1969 | Germany ............................. 302/28 |
| 1,116,154 | 10/1961 | Germany ............................. 302/28 |
| 921,978 | 1/1955 | Germany ............................. 302/28 |
| 1,273,412 | 7/1968 | Germany ............................. 302/28 |
| 6,605,220 | 10/1967 | Netherlands ......................... 302/28 |
| 17,719 of | 1913 | United Kingdom ................... 302/28 |
| 995,129 | 7/1967 | United Kingdom ................... 302/22 |
| 1,074,929 | 6/1965 | United Kingdom ................... 302/22 |

Primary Examiner—Evon C. Blunk
Assistant Examiner—James L. Rowland
Attorney, Agent, or Firm—Donald D. Jeffery

[57] ABSTRACT

A method of pneumatically feeding material in succession, through separators, to receiving stations, with conveying air being discharged from the system only at the last separator in the circuit. Conveying is stopped when the material reaches a predetermined level in the last separator, but commences again when the material falls below that level, which can be achieved by feeding material back through the conduit to the feed station. The apparatus has a series of separators, the last of which filters out exhaust air, with valves responsive to the level of material in the last separator or a pressure rise in the conduit, to stop conveying and to blow back through the conduit to clear the last separator.

8 Claims, 4 Drawing Figures

METHOD AND APPARATUS FOR CHARGING BULK MATERIAL TO A PLURALITY OF RECEIVING STATIONS

BACKGROUND OF THE INVENTION

Various methods and apparatus have been proposed for charging bulk material to a plurality of receiving stations, which are connected in series to a pneumatic conveyor conduit by way of associated separators or traps, from a delivery station connected to a material storage or supply container. The individual receiving stations, for feeding respective material-processing machines associated therewith are charged with material in succession by way of their separators, and the conveying action is interrupted by a blocking or shut-off signal which is triggered when the material deposited in the last separator reaches a predetermined level.

For example German Pat. specification No. 921,978 discloses an apparatus in which the conveyor conduit is a ring conduit through which excess bulk material, i.e. material which is not passed into the separators as they are already full, is returned to the supply container in a continuous circuit. A continuous circuit of this kind, with its additional power requirement, unnecessary wear of the conveyor conduit and its operating members, and any deterioration in the quality of the bulk material, can be avoided if the conveying action is interrupted by a blocking signal which is triggered in the last receiving station connected to the end of the conveyor conduit, when a maximum filling level is reached. For example, in the apparatus of German Offenlegungsschrift No. 1,506,965 the signal is triggered by the pressure rise which occurs when the level of material filling the last receiving station reaches the discharge aperture of the conveyor conduit. A fresh conveying operation is subsequently initiated by a timer.

A necessary condition for the operation of such an apparatus is that, before a new conveying phase begins, the last processing machine has consumed sufficient material that the discharge aperture of the conveyor conduit in the receiving station is again exposed, and the through-flow of conveying air to the exhaust filter at that station is ensured. In practice this means that, when for example a tool change or maintenance work is to be carried out on the last machine, the entire charging apparatus must be rendered inoperative, and this often results in an undesriable waste of time.

It would be possible to overcome this disadvantage by providing all the material-collecting containers forming the respective receiving stations with a filter which is of sufficient size to permit the entire amount of material-conveying air used to flow therethrough. However, this would result in very high costs and in a very substantial additional amount of space being required.

A further problem is posed by the charging of the individual receiving stations themselves; thus in known charging apparatus, the bulk material being conveyed to the stations for feeding processing machines is passed into the pneumatic conveyor conduit, at a feed station, from a storage or supply container, by means of compressed air pressure or by means of a metering or discharge apparatus. The pneumatic conveyor conduit is disposed above the material-collecting containers for receiving the material for the machines, and is connected to each container by way of branch connecting members. In the simplest case, each of these connecting members is formed by a container into which the mixture of bulk material and air is introduced radially. Each container is connected to a radial discharge line leading to the next following container. Separation of the conveyed bulk material occurs, if the container is sufficiently large, by sedimentation of the particles of material being conveyed, under the effect of gravity. It is apparent that when conveying fine dust materials, only a part of the material being conveyed will be separated out, and the remainder will be transported by the carrier gas to the next following machine.

However, as for example the plastics industry often uses mixtures of bulk materials, whose components differ from each other by different grain size and speed of fall, it can happen that primarily the coarse particles of material are separated out in the first separating container, and primarily fine material is separated out in the following containers. There will thus occur an undesirable break-down of the mixture into its components, during conveying.

In order to improve the degree of separation in the above-described gravitational separators, axial partitioning walls can be disposed transversely to the direction of the through-flow of air. Also known are separating devices in which the pneumatic conveyor conduit is passed downwardly into each collecting container and then turns through 180° so as to extend upwardly out again; a branch conduit is connected to the lowest point of the curvature of the conveyor pipe conduit, and opens into the container. In this case separation of material occurs due to centrifugal force, the separated material flowing into the container through the branch conduit.

A further known separating device provides that the conveyor conduit, which is horizontal, opens into the respective collecting container, by way of a curved pipe portion which extends vertically downwardly to form an outlet. Upstream of the pipe curve is a branch connection which is taken out of the horizontal conduit at an angle of about 15° to 90°, and which forms the continuation of the conveyor conduit. As long as the downwardly pointing outlet curved pipe portion is still empty, the greater part of the bulk material being conveyed will fly, due to mass inertia forces, through this pipe into the collecting container. Only when the outlet pipe is filled and there is a stream of material backed up to the main conveyor conduit, is the whole of the arriving bulk material conveyed to the next branch connection, where the separating operation is repeated.

These separating devices generally suffer from the disadvantage that they have a poor level of separation efficiency, and also can readily cause break-down of a bulk material mixture. Thus, it was found in a test run that with a bulk material which is used for making gramophone discs, in the best of the above-discussed known separating devices only about 70 to 80% of the incoming flow of material is separated off. The remaining amount of bulk material, which primarily comprises fine dust (20 to 30%), flows on to the next machine. In this flow of bulk material the fine-grain coloring agent component is substantially higher than in the material which was separated off, which results in undesirable differences in quality of the articles produced in each processing machine.

SUMMARY OF THE INVENTION

An object of the invention is to provide a method and an apparatus, which permit charging of the individual receiving stations, irrespective of the number of receiving stations which are to be found in operation.

A further object is to ensure for each receiving station a uniform composition of bulk material feed.

The method and apparatus of this invention provides that bulk material is passed from a feed station to a plurality of receiving stations in succession, by way of a conveyor conduit. Each receiving station is connected to the conduit by a separator. Conveying air is discharged from the circuit only at the last separator. When the level of material in each separator reaches a predetermined level, the material-air mix flows to the next following separator. When the material reaches a predetermined level in the last separator, the conveying action is stopped, and is reinitiated by reducing the level of material in the last separator. A back-flow of air can be provided through the conduit for this purpose, by returning material to the feed station, under the control of valves responsive to the air pressure in the conduit.

DESCRIPTION OF THE PREFERRED EMBODIMENTS

Figure 1:
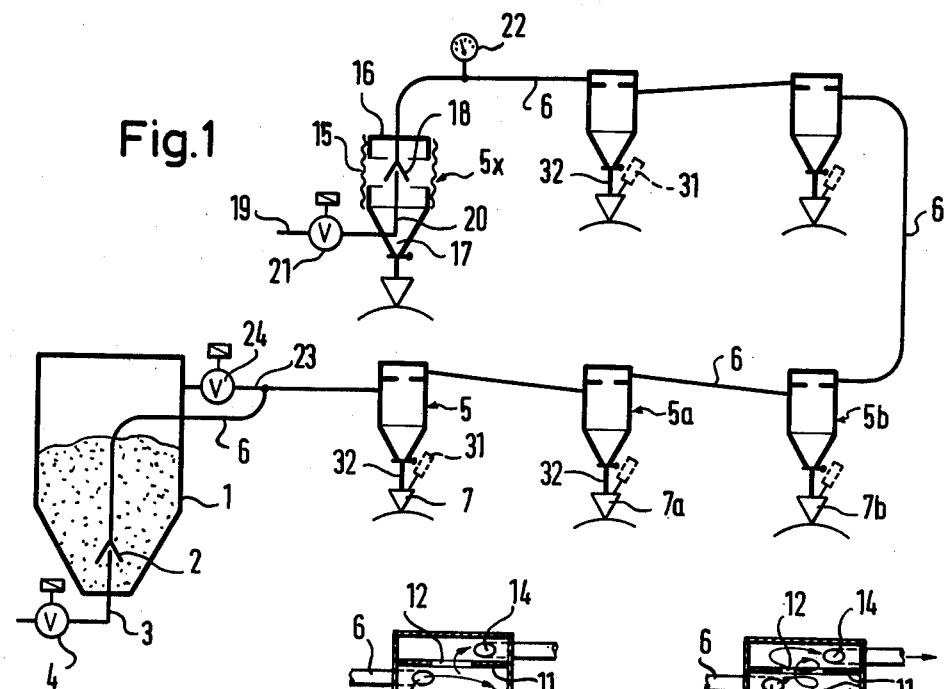
FIG. 1 shows a first embodiment of apparatus of the invention.

In FIG. 1, arranged in the lower part of material storage or supply container 1 which forms a feed station is an ejector 2, while an electromagnetically actuated valve 4 is provided in a compressed air supply conduit 3 to the ejector 2. Separators 5, 5a, 5b . . . 5x at respective receiving stations are connected to the feed station 2 by a pneumatic conveyor conduit 6. Arranged below each receiving station is a charging hopper 7, 7a, 7b . . . 7x of a material-processing machine to be supplied with material.

Instead of a construction in which the separators are each in the form of a separate branch from the conveyor conduit 6, in this case the separators 5, 5a, 5b . . . , with the exception of the last separator 5x, are to a certain extent combined together with the respective branch connection from the conduit 6, and are formed in the manner of a centrifugal force separator.

Figure 2:
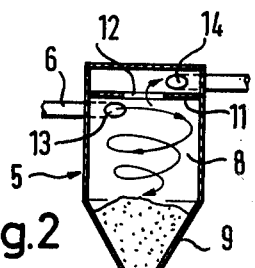
FIG. 2 shows a view in cross-section on an enlarged scale of a receiving station during filling.
Figure 3:
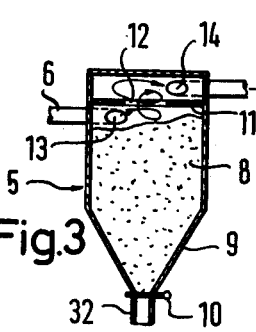
FIG. 3 shows a similar view to FIG. 2, but after the station has been filled.

Each of the separators, as shown in FIGS. 2 and 3, comprises a vertical closed container body 8 of round cross-section and a conical lower portion 9 to which the associated material-processing machine is connected, below a blocking slide member 10. Disposed in the container body 8, towards the top thereof, is a horizontal separating wall 11 which has a central opening 12. Just below the separating wall 11 the conveyor conduit 6 opens tangentially into the container body 8 at an opening 13. Above the separating wall 11 a downstream continuation of the conveyor conduit 6 goes out of the container body 8, tangentially in the same direction of rotation, at opening 14, for subsequent connection to the next following receiving station.

In contrast to the upstream separators, the last separator 5x is in the form of a filter separator. It has a cylindrical wall which is formed at least in part by a filter such as an air-transmissive textile or fabric tube 15 which is clamped between a cap 16 and a collecting hopper 17. The discharge end of the conveyor conduit 6 extends downwardly through the cap 16 where it is enlarged into an inverted funnel configuration 18. Introduced into the collecting hopper 17 from the side is a compressed air line 19 which ends in an injection nozzle 20 directed upwardly into the enlarged funnel-shaped portion 18 of the end of the conveyor conduit 6. The compressed air line 19 includes an electromagnetically actuated valve 21.

A pressure-measuring means 22 is connected to the conveyor conduit 6, adjacent to the last separator 5x.

Upstream of the first separator 5, a branch connection 23 with an electro-magnetically actuated valve 24 is connected between the conduit 6 and the supply container 1. The electrical circuits and control means which operatively connect the pressure-measuring means 22 and the valves 4, 21 and 24 are of known kind, and will not therefore be described in detail here.

When the apparatus is set in operation for first filling the receiving stations by way of the separators 5, 5a, 5b, . . . 5x, the flow of air through the ejector 2 entrains material from the container 1 into the conduit 6. The flow of bulk material and air firstly flows into the first separator 5. In this separator it enters through the opening 13 below the separating wall 11, and, by the circular movement as shown in FIG. 2, the bulk material carried by the air flow is almost 100% separated out in the container 8, 9; the carrier air escapes through the openings 12 and 14 into the downstream continuation of the conveyor conduit 6. As soon as the level of material deposited in the container 8, 9 reaches the inlet opening 13, the upper surface of the bulk material which has been deposited in the container 8, 9 acts as a deflecting surface in respect of the flow of bulk material and air, and deflects this flow directly through the central opening 12 in the separating wall 11 and to the outlet opening 14, from which it continues through the conveyor conduit 6 to the second separator 5a. This operation is repeated until the penultimate receiving station is filled.

In the last separator 5x the bulk material is deposited due to the force of gravity, while the conveyor air escapes through and is filtered by the tube 15. If the separated material deposited in this separator reaches the funnel-shaped end portion 18 of the conveyor conduit 6 and finally blocks the outlet, there is a considerable rise in pressure in the conveyor conduit 6. When the pressure exceeds a predetermined threshold value, the pressure-measuring means 22 causes a blocking shut-off signal to be triggered, which stops the material conveying operation by closing the valve 4 upstream of the ejector 2.

Thereupon, for example by the operation of a timing relay which is set in operation when the blocking signal is triggered, the valve 21 upstream of the nozzle 20 in the last separator 5x and the valve 24 in the branch connection 23 are opened. Due to the ejector action of the nozzle 20, in conjunction with the end portion 18 of the conveyor conduit 6, a part of the deposited bulk material is entrained and passed through the conveyor conduit 6 and the branch connecton 23, together with any deposits in the conveyor conduit 6 itself, back into the supply container 1, until the end portion 18 of the conveyor conduit 6 is free again.

Thus, after reclosure of the valves 21 and 24, it is readily possible as required for each individual receiving station 5, 5a, 5b . . . 5x to be filled again by fresh initiation of the conveying action. The cycle of suspension and resumption of the conveying operation will occur automatically, as described above.

An advantage of the above-described construction of the separators 5, 5a, 5b . . . in the manner of a centrifugal force separator is that, as has been shown, the bulk material is almost 100% separated out in each receiving station, before filling of the next following receiving station begins. This is not the case where, as in some of the above described prior constructions, the receiving stations are connected to the conveyor conduit by separate branch connections, for in such a case the heavier components of a bulk material are separated out first, and the lighter components are conveyed further on downstream so that the mixture of bulk material breaks down along the conveying path.

Instead of the blocking signal for stopping the conveying operation being triggered by measuring the rise in pressure in the conveyor conduit 6, this can be effected by measuring the filling level of material in the last separator.

Compensating filters 31, as indicated in broken lines in FIG. 1, which have a smaller air through-flow surface area than the main filter 15, can be provided if the air flowing through a material-filled connecting conduit 32 between the respective separator and the receiving container 7, 7a, 7b, is to be exhausted so that the pressure in the receiving container cannot be higher than atmospheric pressure.

Figure 4:
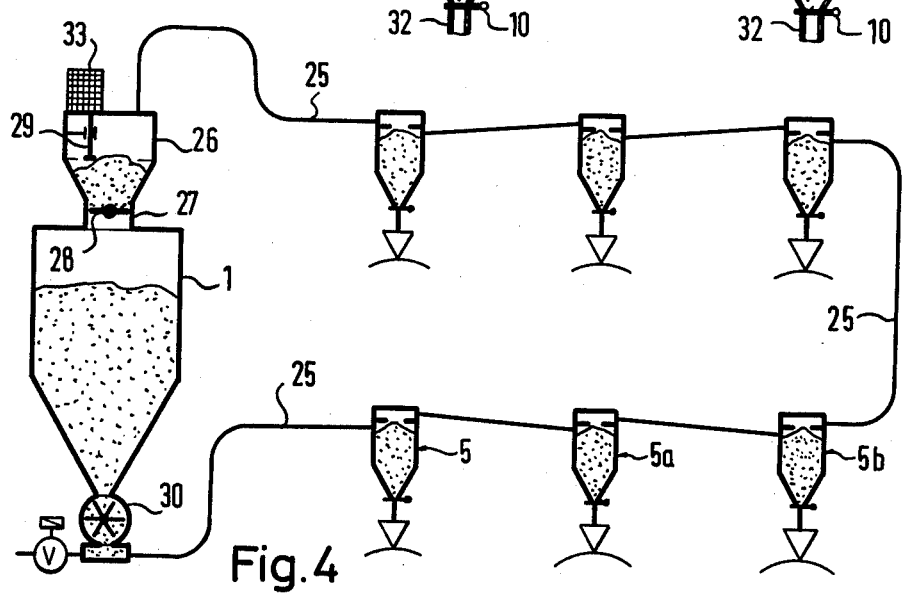
FIG. 4 shows a second embodiment of the apparatus of the invention.

In the second embodiment in FIG. 4 conveyor conduit 25 opens at its discharge end into a separator 26 which is disposed above the supply container 1 and which is connected thereto by a dropping shaft 27 with a flap valve 28. Arranged in the separator 26 is a level sensing means or probe 29 which, after the preceding separators 5, 5a, 5b . . . have been filled and a given level of material has been reached in the separator 26, triggers a blocking signal for stopping the conveying operation. In addition, in this second embodiment a cell wheel valve 30 is used for the conveying operation, this wheel possibly being preferred to an ejector device as in FIG. 1, according to the material to be conveyed.

After the conveying operation has been stopped, the flap valve 28 in the shaft 27 is opened, for example by way of a timing relay, and the bulk material which has accumulated in the separator 26 falls back into the supply container 1, which causes the blocking signal to be stopped and the residual pressure in the conveyor conduit 25 to be reduced, entraining any bulk material which has remained lying in the conveyor conduit 25. In addition, at the same time as the flap valve 28 is opened, an apparatus for cleaning the air filter 33 of the separator 26 can be set in operation.

I claim:

1. A method of charging bulk material from a feed station to a plurality of receiving stations which are each connected in series to a pneumatic conveyor conduit by way of respective separators, comprising successively charging the individual receiving stations by way of their associated separators, each separator being substantially filled before bulk material is passed to the next successive separator, discharging exhaust air from the conveyor conduit circuit only at the most downstream separator, interrupting conveying by a blocking signal which is triggered when a predetermined level of material is reached in the last separator, and initiating continuation of conveying only by reducing the level of material only in the most downstream separator below the level which triggers the blocking signal.

2. A method according to claim 1 wherein the blocking signal is triggered by the rise in pressure in the conveyor conduit which occurs when the level of material in the most downstream separator reaches the discharge opening of the conveyor conduit in the separator, and wherein the level of material in the most downstream separator is reduced below the level of the discharge opening of the conveyor conduit by means of a compressed air flow which is passed through the conveyor conduit in the opposite direction to the conveying air flow direction and which carries a part of the bulk material from the last separator through the conveyor conduit back to the feed station.

3. A method according to claim 1 wherein the most downstream separator is operatively associated with a supply container, at the feed station, and the contents of the separator are discharged by the force of gravity into the supply container, for the purposes of initiating a continuation of conveying operation.

4. A method according to claim 1 wherein the predetermined level of material triggering the blocking signal in the most downstream separator is detected by a level sensing means.

5. Apparatus for charging bulk material to a plurality of receiving stations comprising a material feed station; a pneumatic conveyor conduit for conveying material from the feed station; a plurality of separators connected in succession to the conduit and operatively associated with respective receiving stations, each of said separators being constructed and arranged relative to said conduit so that each separator is filled in succession before the next separator is charged with bulk material, the most downstream separator having a filter for the discharge of air from the conduit circuit, means for interrupting material flow only when the most downstream separator is filled to a predetermined level, and means for initiating continuation of conveying only by reducing the level of material only in said most downstream separator to a level below said predetermined level.

6. Apparatus according to claim 5 wherein the most downstream separator is arranged above the supply container and is connected thereto by a drop shaft capable of being closed by a valve.

7. Apparatus according to claim 5 wherein each of the individual separators, with the exception of the most downstream separator, comprises a closed vertical container of round cross-secton, a horizontal separating wall with a central through-opening within the container the conduit opening into each said container tangentially below the separating wall and the downstream continuaton of the conveyor conduit being connected to the container tangentially in the same direction of rotation and above the separating wall.

8. The apparatus of claim 5 further including a blowing nozzle having an end portion adjacent the discharge end opening of the conveyor conduit within said most downstream separator for ejecting material therefrom subsequent to the filling thereof above said predetermined level, and a closable branch connection connecting said conveyor conduit between the upper part of said feed station and the first separator.

* * * * *